United States Patent [19]
Ikarimoto

[11] 3,876,022
[45] Apr. 8, 1975

[54] STAIRWAY-CLIMBING CART
[75] Inventor: Yasuaki Ikarimoto, Sendai, Japan
[73] Assignee: Sunwa Sharyo Mfg. Co., Ltd., Tokyo, Japan
[22] Filed: Dec. 6, 1973
[21] Appl. No.: 422,555

[30] Foreign Application Priority Data
Dec. 25, 1972    Japan................................ 48-71052

[52] U.S. Cl................................. 180/9.22; 305/33
[51] Int. Cl............................................. B62d 55/00
[58] Field of Search ........... 180/9.22, 9.2, 9.32, 9.5; 305/33; 280/5.22, 5.28

[56] References Cited
UNITED STATES PATENTS
2,154,377   4/1939   Cory .............................. 180/9.2 R
2,844,413   7/1958   Gates............................. 180/9.22 X

*Primary Examiner*—Philip Goodman
*Attorney, Agent, or Firm*—Ernest G. Montague; Karl F. Ross; Herbert Dubno

[57]                ABSTRACT

A stairway-climbing cart for lifting loads comprises a carrier frame, a pair of driven belt-crawlers disposed on both sides of the carrier frame, a driving belt-crawler disposed on the central portion of the carrier frame and having a crawling surface positioned for a slight lower level than that of the driven belt-crawlers and having a length spanning between at least two steps.

4 Claims, 8 Drawing Figures

STAIRWAY-CLIMBING CART

DETAILED DESCRIPTION OF THE INVENTION:

The present invention relates to a cart for lifing loads up a stairway and serving as a general utility cart for carrying loads on a floor.

It has been well known that the prior-art stairway-climbing cart for lifting loads up a stairway involves a pair of driving belt-crawlers disposed on both sides of the carrier frame where the cart of such type is used on a stairway having an intermediate stage or level for changing the lifting direction, it is necessary to provide a driving-power transmission system for each driving belt-crawler which involves a clutch device or a differential gears. The transmission system is of a complicated construction which increases the cart body weight. Furthermore, it is difficult to operate the cart without a skilled operator and on a stairway such as a spiral stairway on which the cart should be lifted while turning continuously.

An object of this invention is to provide a stairway-climbing cart capable of lifting loads on a stairway without the controlling operation of the transmission system and easily operable on special types of stairway such as a spiral staircase.

Another object of this invention is to provide a stairway-climbing cart which is also capable of being used on a floor and in particular to bear the cart body so as to require only slight handling operations.

BRIEF DESCRIPTION OF THE DRAWING

The features and advantages of this invention will be apparently understood from the following description with reference to the accompanying drawing in which.

SPECIFIC DESCRIPTION

Referring to FIGS. 1 to 4, there is provided a cart for lifting on a stairway embodying the present invention. The cart comprises a carrier frame 1 of pipes, a receiving plate 2 for a load attached to the front end of the frame 1, a loop handle 3 made of a pipe attached to the rear end of the frame 1, and a supporting body 4 rigidly secured to the under portion of the frame 1. The supporting body is preferably formed by diecasting.

The cart further includes a pair of driven belt-crawlers 5 disposed on both sides of the carrier frame 1. Said driven belt-crawlers 5 each comprise grooved wheels 8 and 9 journaled to pivot shafts 6 and 7 protruding from the side wall of the supporting body 4, and an endless belt 10 of rubber stretching between and around to the wheels 8 and 9. A supporting plate 11 extends from the side wall of the supporting body laterally along the stretched portion of the endless belt 10 and so as to support the portion of the endless belt 10 corresponding to the crawling surface. The pivot shaft 7 is inserted into a bore 4a formed in the side wall of the supporting body 4 and enlarged in a lengthwise direction of the cart, and having a screw coupled to a nut 12, so that the shaft 7 is adjustable in said bore 4a and is fixed to the supporting body 4 by the nut, whereby the endless belt 10 is tensioned. The endless belt 10 comprises a central portion 10a fitted with the grooves 8a and 9a of the wheels 8 and 9, and side rim portions 10b brought into contact with the peripheries of flanges 8b and 9b formed at both sides of the wheels 8 and 9, so that the endless belt 10 is prevented from shifting out of place.

The cart comprises a driving belt-crawler 13 disposed on the central portion of the carrier frame 1 and having a crawling surface positioned for a slight lower level than that of the driven belt-crawlers 5. The crawling surface of the driving belt-crawler 13 has a length spanning at least two steps of the stairway. Said belt-crawler 13 comprises toothed wheels 14 and 15 journaled to the front and rear portions of the supporting body 4, and an endless belt 16 of rubber stretching between and wound to the wheels 14 and 15. The wheels 14 and 15 have gear teeth 14a and 15a each intermeshed with teeth 16a formed on the inside surface of the endless belt 16. In order to avoid slippage of the belt 16 on the wheels, the wheels 14 and 15 have flanges 14b and 15b formed at both sides of each of the wheels. And the endless belt 16 has plurality of transverse protrusions 16b formed on the outside surface of the belt 16 with a prescribed pitch and engageable with the edge of each step.

The wheel 14 is connected with a transmission shaft 18 projecting from a geared reducer 17, and the wheel 15 is rotatably supported on a shaft 19 which has its both ends inserted through bores 4b and 4b formed on the side walls of the supporting body 4, and is positioned at a desired place by the adjustment of bolt-nuts 20 in a manner to slide the shaft 19 in the bores 4b, so that the endless belt 16 is in tension. The reducer 17 as well as a motor 21 connected with said reducer and batteries 22 are set on the supporting body 4. The motor and batteries are provided with an electric connection having a wire line 23 and a manual switch 24 which is used for controlling of the energization to the motor.

Figure 1:
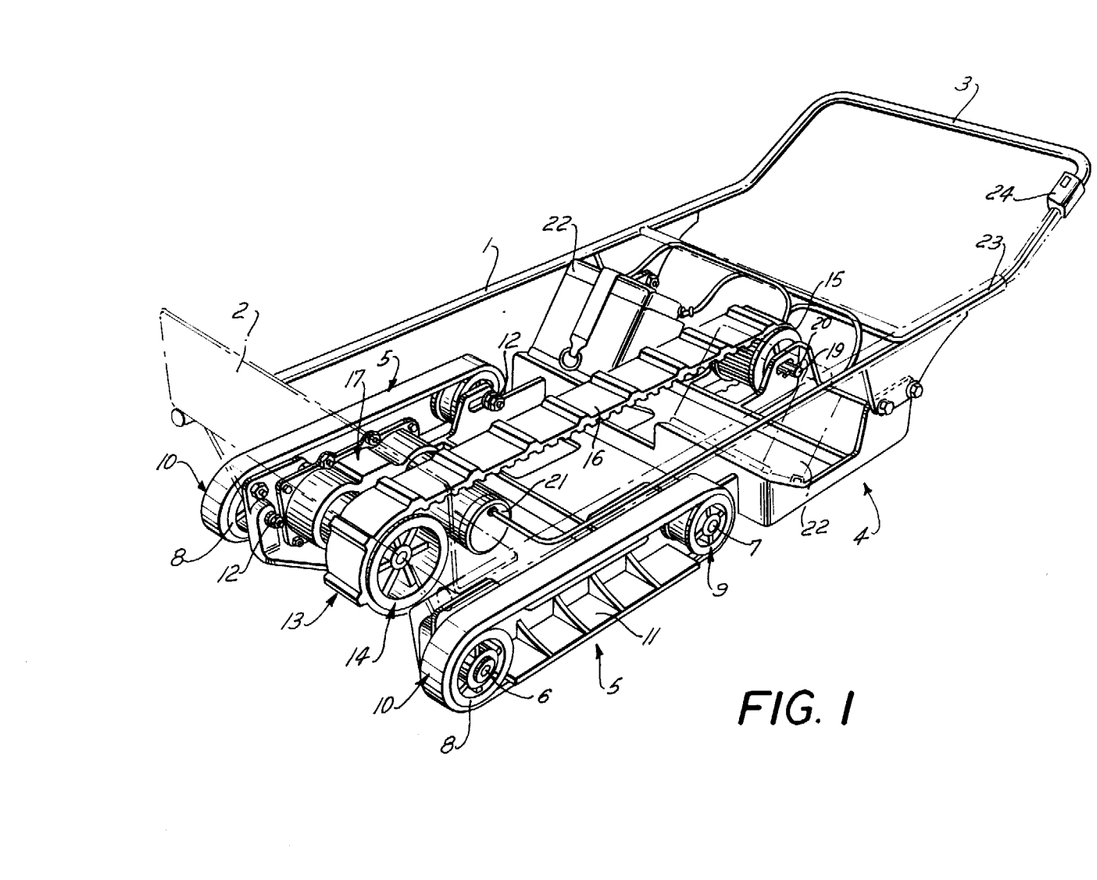
FIG. 1 is a perspective view of a stairway-climbing cart embodying the present invention.
Figure 2:
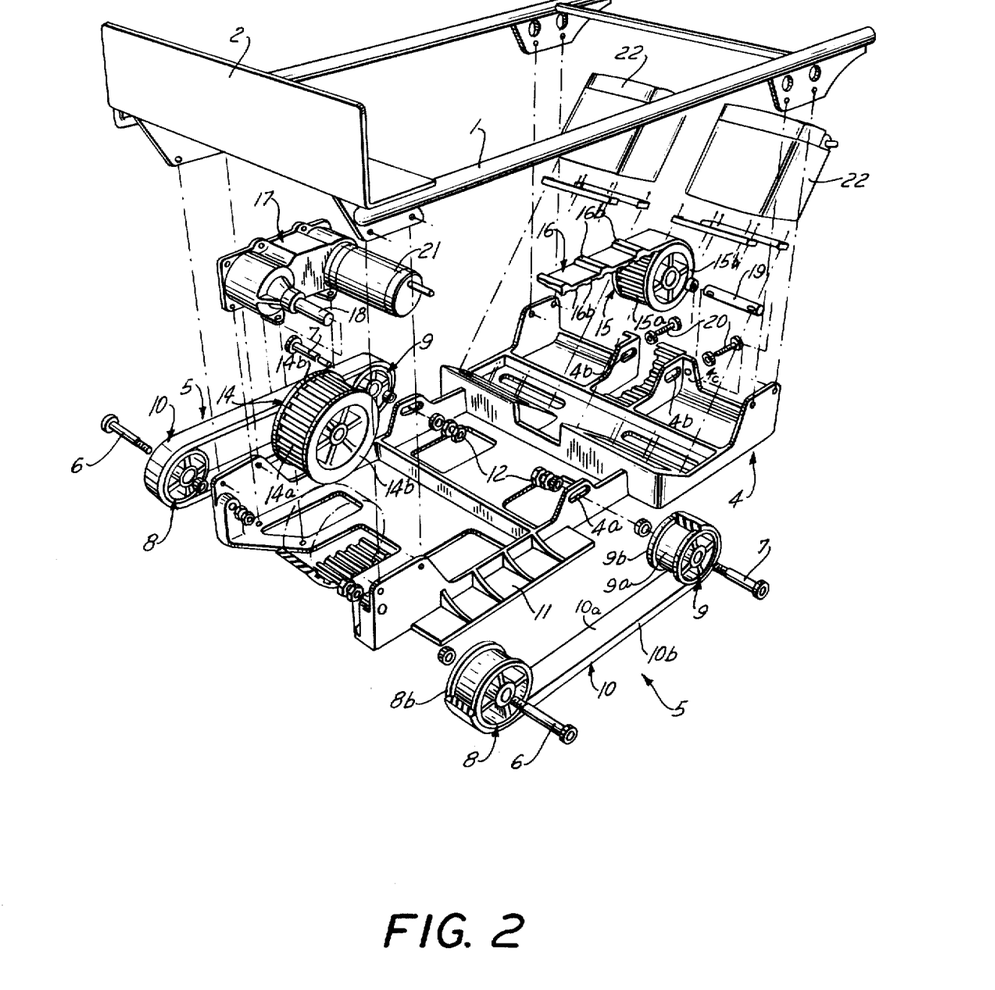
FIG. 2 is a perspective view of the cart of FIG. 1 which is disassembled in parts.
Figure 3:
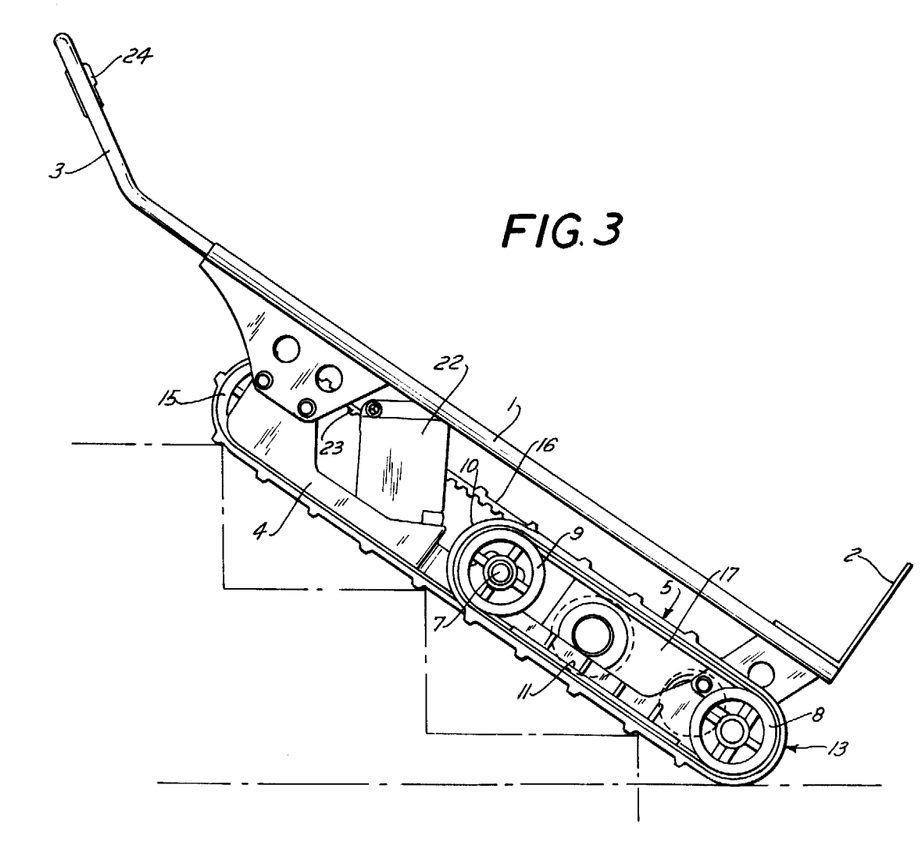
FIG. 3 is a side view of the cart as it is being caused to climb a stairway.
Figure 4:
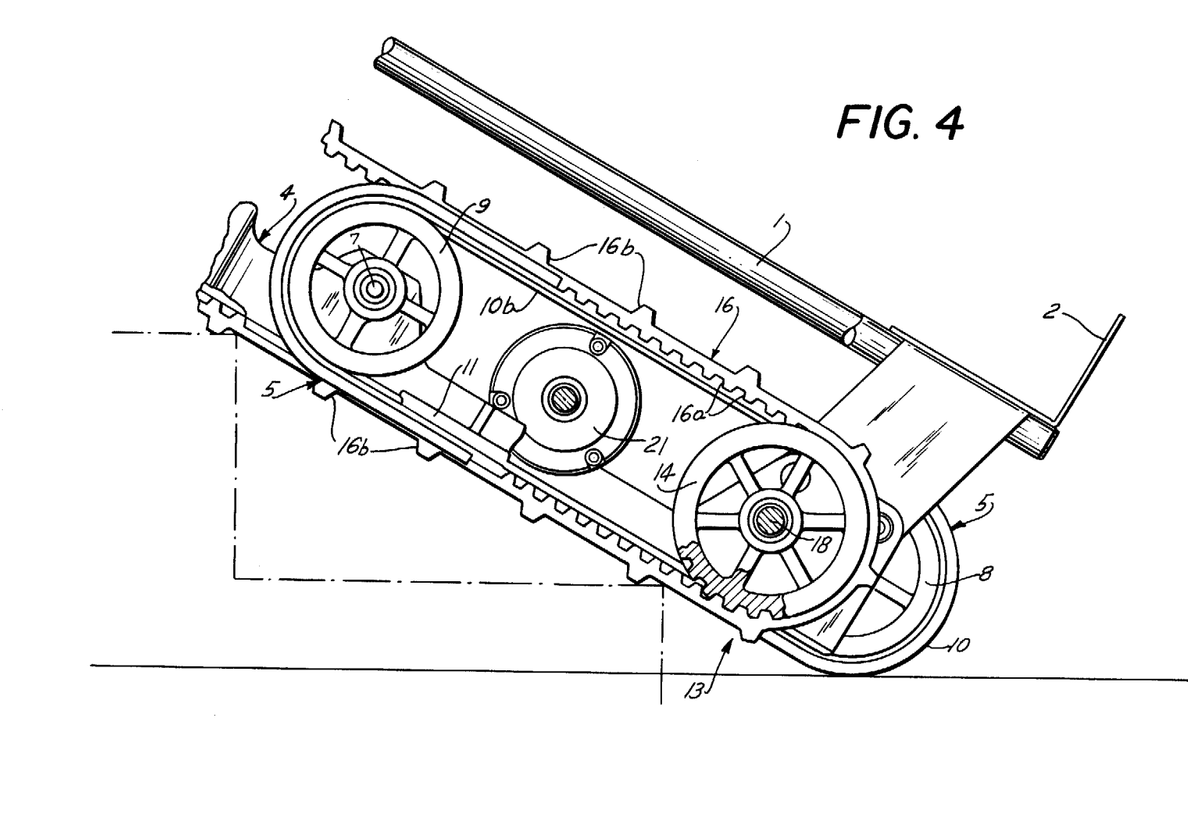
FIG. 4 is an enlarged side view of the cart.

In operation, as when climbing the stairway, the belt-crawlers 5 serve to support the cart body against lateral turning, and the belt-crawler 13 acts on climbing lifting. The cart is easily lifted in a stable condition, because the driving belt-crawler has a length spanned between two steps of the stairway, even if the handlle is not inclined.

The driving endless-belt 16 only is supplied with a lifting power from the motor, so that the operator can easily and smoothly turn the cart body on the stage of the stairway, without operating clutches. For the same reason, the cart can be caused to climb on a spiral stairway with ease.

Where the cart is displaced along a floor, the handle 3 is kept in such inclination that the belt-crawler 13 is spaced above the floor and the belt-crawlers 5 and 5 support the cart body on the floor.

Another embodiment of this invention modified from that of the above-mentioned device is illustrated in FIGS. 5 to 8 in which the stairway-climbing cart is further provided with a pair of running wheel assemblies described hereinafter.

Each of the running wheel assemblies comprises a support member 25 having an L-shaped bracket 25a rigidly secured to the side wall of the supporting body and the supporting plate 11 by means of bolts, and a bearing tube 25b welded to the vertical wall of the bracket 25a. Furthermore, the running wheel assembly includes a carrying wheel 26, a supporting arm 27 formed with a triangular shape and to which the carrying wheel 26 is pivotally supported, and two pin-shaped rods 28 and 29, the rod 28 being detachably inserted into the bearing tube 25b. The other rod 29 is brought into contact with the lower crawling surface of the belt 10 as the cart is carried on the floor.

Figure 5:
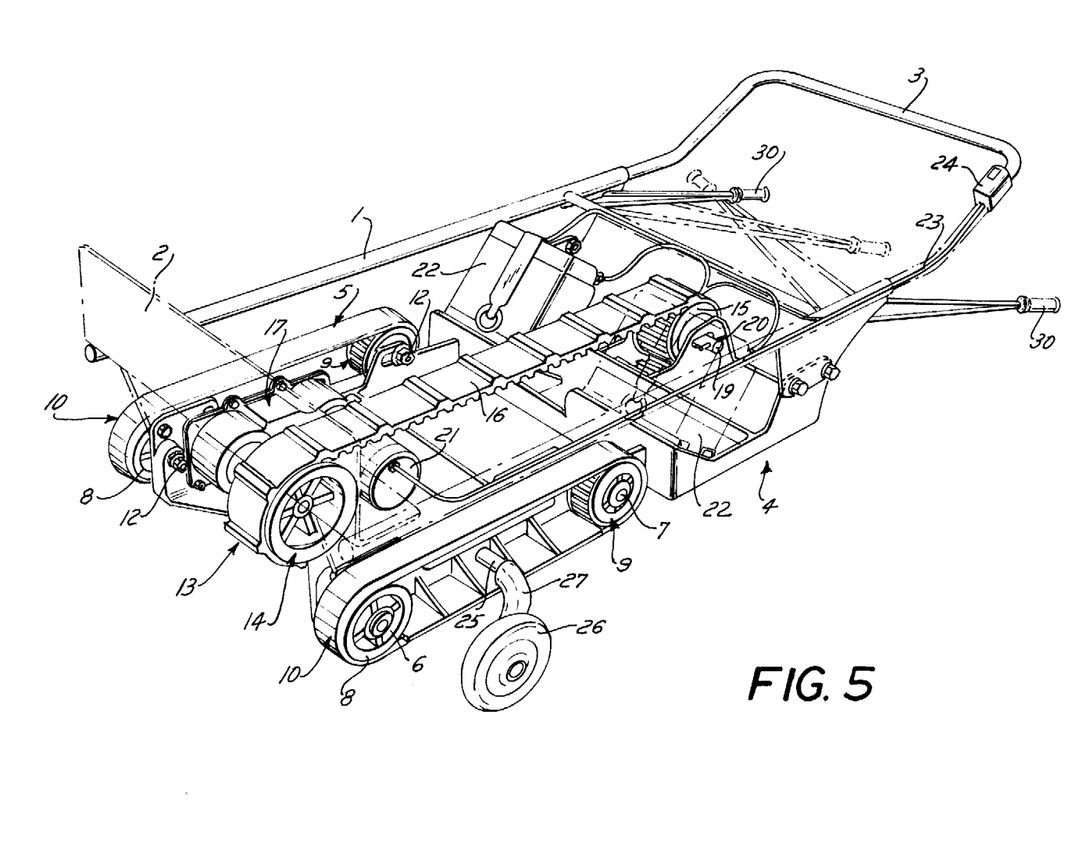
FIG. 5 is a perspective view of another embodiment of a cart modified from that of FIG. 1.
Figure 6:
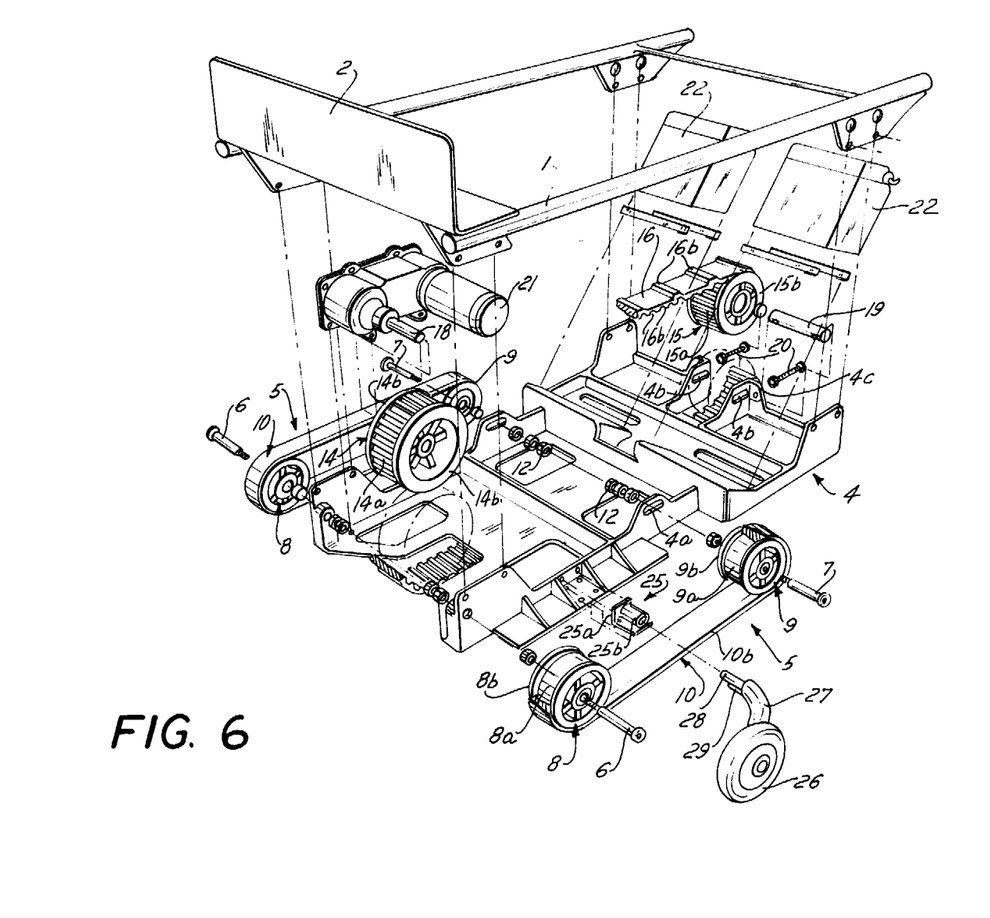
FIG. 6 is a perspective view of the cart of FIG. 5 which is disassembled in parts.
Figure 7:
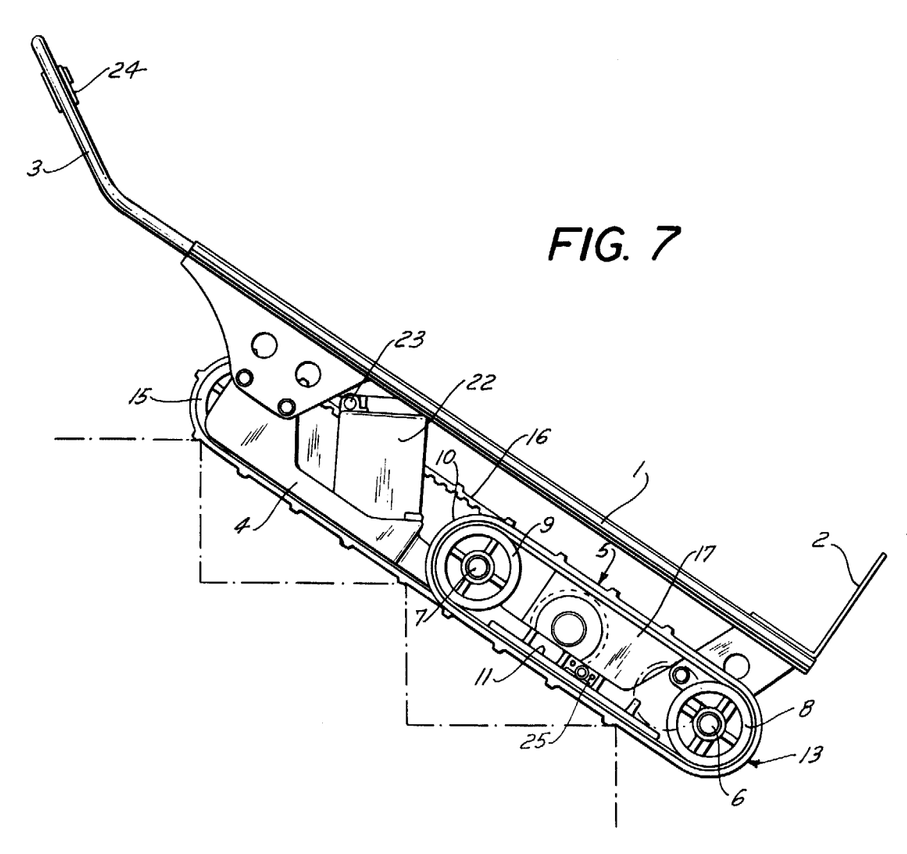
FIG. 7 is a side view of the cart of the second embodiment which is being lifted on a stairway.
Figure 8:
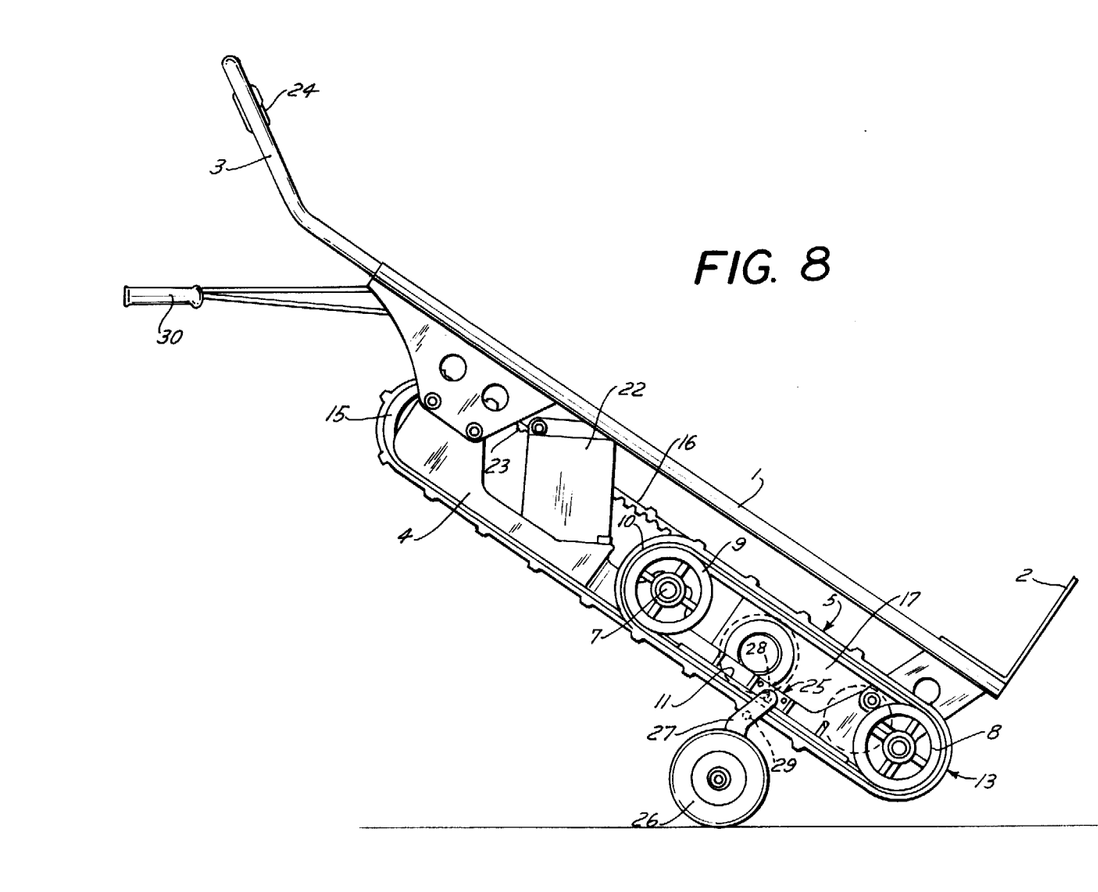
FIG. 8 is a side view of the cart which is carried on a floor.

In operation, the running wheel assemblies are mounted on the cart body as shown in FIGS. 5 and 6 when the cart is set on the floor. In this case, the cart body is supported by the running wheels 26 disposed at the sides of the cart and positioned near the center of gravity of the load, so that the handle can be lightly operated without loading. Furthermore, the connection of the rod 28 with the bearing tube is completely maintained by the crawler belts 10 being forcedly clamped between the rods 28 and 29 so as to be not released. In the case where the cart rests on the floor, the dropping of the belts 10 is prevented with the rods 29 depressed on the crawling surfaces of the belts 10 respectively.

In the second embodiment, there are provided two auxiliary bar handles 30 and 30 collapsibly attached to the side portions of the loop handle so as to be used as handles for carrying the cart on the floor.

What is claimed is:

1. A stairway-climbing cart for lifting a load on a stairway, comprising a carrier frame, a pair of driven belt-crawlers disposed on both sides of the carrier frame and having idler wheels and endless belts stretching between the wheels and wound to them, a driving belt-crawler disposed on the central portion of the carrier frame and having a driving wheel, a driven wheel and an endless belt stretching between the wheels and wound to them, said endless belt having a crawling surface positioned for a slight lower level than that of the driven belt-crawlers and a length spanning at least two steps of the stairway.

2. A cart for lifting on a stairway claimed in claim 1 in which there are provided a pair of running wheel assemblies detachably joined to the sides of said frame and having carrying wheels positioned near the center of gravity of the weight load, and a handle connected to the body.

3. A cart for lifting on a stairway claimed in claim 1, further comprising a handle on said frame, the front end portions of the driven belt-crawlers being positioned at a place in which the driving belt-crawler is elevated from the floor and the driven belt-crawlers are carried on the floor when a handle is maintained in an inclination.

4. A cart for lifting on a stairway claimed in claim 2 in which each endless belt of the driven crawlers is clamped by the static members of the running wheel assembly when the cart rests on floor.

* * * * *